United States Patent [19]

Pring

[11] 4,157,614

[45] Jun. 12, 1979

[54] ARMOR WRAPPING TOOL

[75] Inventor: Teofilo Pring, Brookline, Mass.

[73] Assignee: Boston Insulated Wire & Cable Co., Boston, Mass.

[21] Appl. No.: 907,097

[22] Filed: May 18, 1978

[51] Int. Cl.² ............................................. B23Q 1/00
[52] U.S. Cl. ........................................ 29/745; 29/728; 29/283.5; 242/7.08
[58] Field of Search ............... 29/424, 456, 728, 745, 29/283.5, 267; 242/7.08, 7.09; 72/409; 57/10

[56] References Cited

U.S. PATENT DOCUMENTS

| | | | |
|---|---|---|---|
| 1,117,684 | 11/1914 | McMurtrie | 29/728 |
| 2,240,125 | 4/1941 | Strube | 57/10 |
| 2,274,833 | 3/1942 | Hubbard | 57/10 |
| 2,316,349 | 4/1943 | McMinn | 29/728 X |
| 3,026,052 | 3/1962 | Wade | 242/7.08 |
| 3,132,416 | 5/1964 | Hait | 29/728 X |
| 4,112,565 | 7/1978 | Sailas | 29/456 |

*Primary Examiner*—Leon Gilden
*Attorney, Agent, or Firm*—Kenway & Jenney

[57] ABSTRACT

A portable hand tool for forming and applying metallic tape as armor on cables. The tool includes a magazine for holding the metallic tape, replaceable roller dies for contouring the tape, a rack and pinion ratchet mechanism for moving the dies over the tape, and a pair of handles for manipulating the rack and pinion and rotating the entire tool about the cable being taped.

9 Claims, 2 Drawing Figures

ARMOR WRAPPING TOOL

BACKGROUND OF THE INVENTION

This invention relates in general to the application of metallic tape as armor to a cable in the field and more particularly to such a tool in which the armor may be of any desired contour, interlocking or overlapping, and wrapped upon cable of any shape.

It is customary to provide metallic armor upon cables to protect the conductive elements from abrasion. Such armor in the form of metallic tape is easily and conveniently applied at the point of manufacture, usually with power-driven machinery. However, in the field when the cable is put into use, occasionally failure of the conductors of the cable or even its armor occurs.

Such failures are most frequent in those areas of operation where rough handling and usage are encountered. As a specific example, at an oil well site either the armor itself may be broken away or failures of the conductive elements occur because of the abuse to which the cable is inevitably exposed. In either case, if suitable repairs are to be made, metallic armor must be applied to restore protection of the integrity of the cable.

Also, of course, it is frequently necessary in the field to splice sections of cable together, and after such splices are made armor must be applied over the spliced area. Quite commonly, it is attempted manually to unwind the armor tape and then to wind new armor over the point of the break or splice. The operation is difficult almost to the point of impossibility because of the severe metal deformation resulting from such unwinding and winding. Moreover, if the newly applied metallic tape is not seated properly upon the cable, excessive bulging results and the cable cannot be reinstalled in the restricted downhole passages usually available in oil well applications.

BRIEF SUMMARY OF THE INVENTION

A principal object of the present invention is to make possible the wrapping or replacing of metallic tape as armor on cable in the field in a fashion equivalent to that available now only with power-operated machinery in a manufacturing plant. Basically, the invention resides in a portable tool of relatively simple structure which is capable of forming armor of any desired contour and wrapping it upon cable of any of a number of different cross-sections. The tool includes a cable-engaging shoe attached to one end of a rack, the other end of which is provided with a handle. Depending from the frame is a magazine for containing a roll of metallic tape.

Mounted upon the rack is a frame which encloses tape-forming roller dies and in which a pivoted second handle is disposed. The second handle is movable toward and away from the first and carries a push rod for engaging a pinion which moves along the rack to move the frame and rotate the forming dies over the tape. The formed tape is fed through the shoe and the tool is then rotated about the cable to apply the formed tape as armor upon the cable.

For a better understanding of the invention, reference should be made to the following description and appended drawings which relate to a preferred embodiment of the invention.

DESCRIPTION OF A PREFERRED EMBODIMENT

Figure 1:
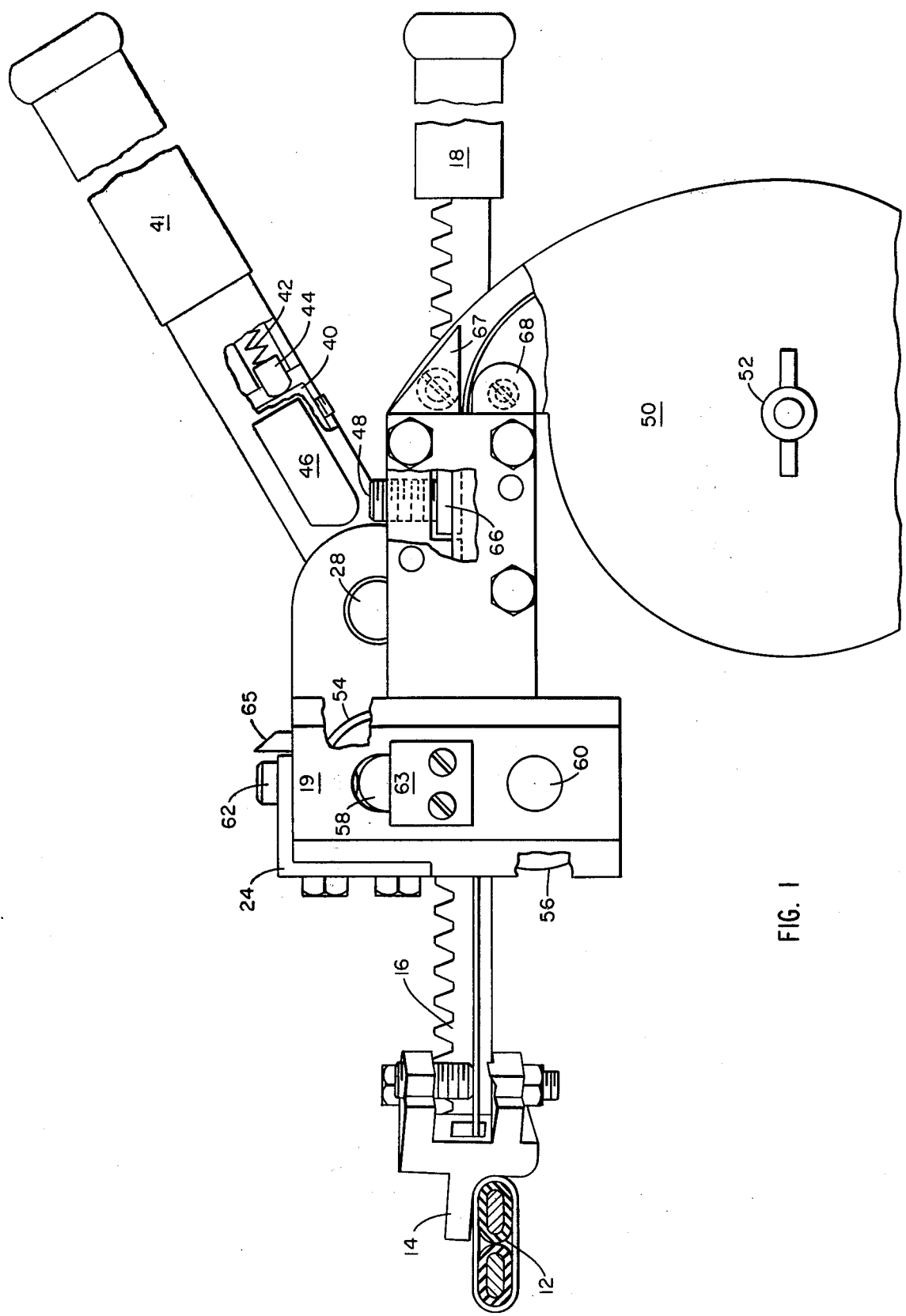
FIG. 1 is a front elevation partly in section and partly cut away of an armor wrapping tool.
Figure 2:
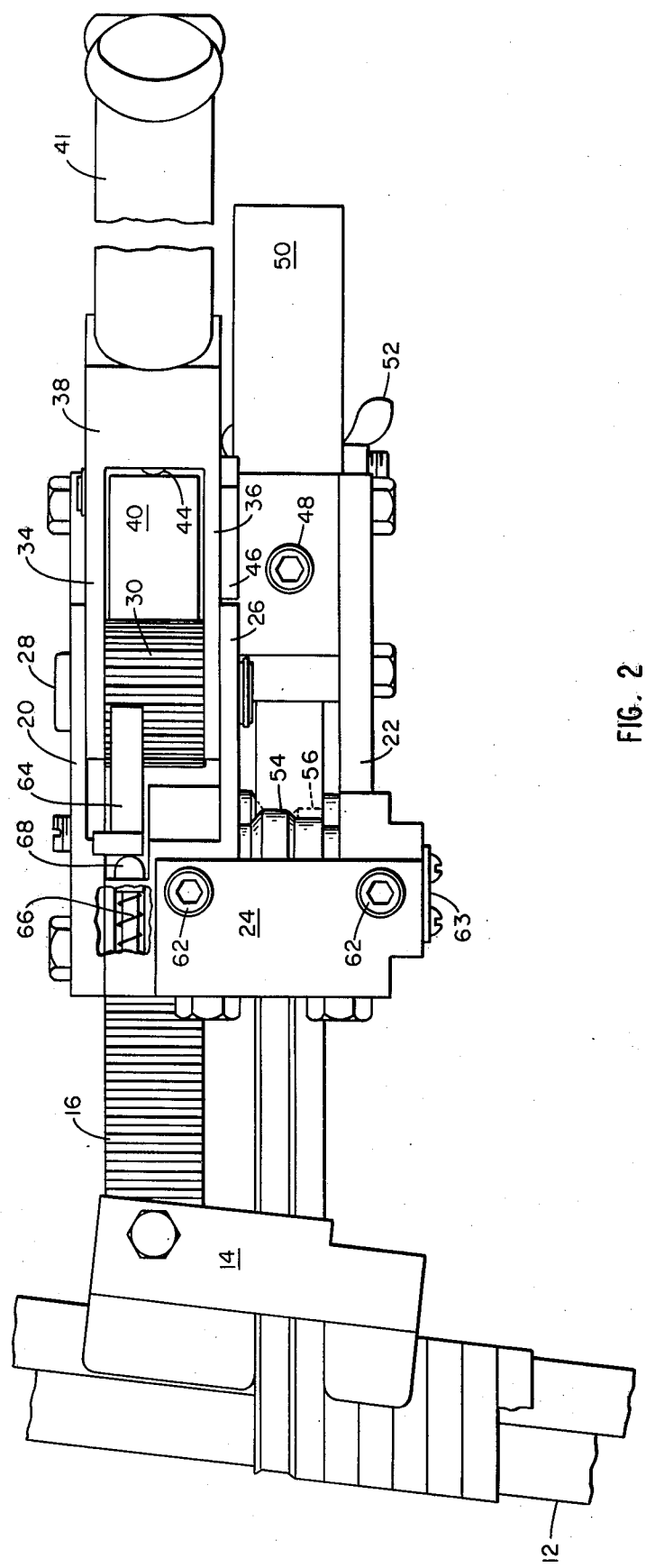
FIG. 2 is a plan view also partly cut away of the tool of FIG. 1.

As has been noted, the tool of the present invention is applicable to cable of any practical size or shape. In FIGS. 1 and 2, a flat cable 12 is illustrated, such "flat" cable having a generally elliptical cross section. Because of the combined straight and curved areas, flat cable is one of the more difficult types on which to wrap armor as compared, for example, to symmetrically round cable.

A contact shoe 14 designed to be manually held in engagement with the cable 12 is shown at the left. The shoe 14 is bolted, preferably at a slight angle, to a rack 16 to facilitate spiral wrapping. The precise contour of the shoe may be varied depending upon the type of cable being wrapped, the size of the metallic tape, and the contouring of the tape.

The rack 16 extends to the right from the shoe 14 and a handle 18 is attached at the end remote from the shoe. A frame 19 including side plates 20 and 22 is mounted upon the rack. An angle 24 forms the major support element at the top of the frame and also downwardly along the front of the frame. These and other elements of the frame may be joined in any convenient fashion, a bolted structure being suitable.

A middle plate 26 is held between the side plate 20 and the end of the angle support 24. The middle plate 26 is formed with a shoulder and an extension which runs parallel to the side plate 20 with which it forms a first yoke. A pin 28 passes through and is held in position in the first yoke formed by the plates 20 and 26 to serve as the shaft for a pinion gear 30. The pinion gear 30 is disposed for rotation in a second yoke formed by the plates 34 and 36, the second yoke being pivotable within the first.

Attached to or integral with the yoke formed by the plates 34 and 36 is an open frame 38 on the end of which there is fixed a handle 41. Adjacent and operative upon the pinion 30 and pivoted in the frame 38 is a push rod 40. The push rod 40 is normally urged into contact with a tooth of the pinion 30 by a compression spring 42 bearing against a rounded pin 44, which in turn contacts the push rod 40. Engagement and disengagement of the pinion 30 by the push rod 40 is controlled by contact of a dog 46 which pivots with the push rod 40.

A magazine 50 having a removable cover normally held in place by a wing nut 52 is supported from the side plate 22 and the middle plate 26 by means of bolts.

Within the frame two removable roller dies 54 and 56 are rotatably mounted upon shafts 58 and 60 respectively. The two dies may be urged together by adjustable pressure exerted upon the shaft 58 by bolts 62. A removable guard plate 63 is held against the end of the shaft 58 to retain it in position in the frame 19.

As may be more clearly seen in FIG. 2, a ratchet 64 engages the pinion 30 to permit its rotation only in a clockwise direction as shown. The ratchet is normally maintained in operative position by a compression spring 66 bearing upon a rounded pin 68 which contacts an extension 65 of the ratchet.

Tape contained in the magazine 50 is threaded through guide blocks 67 and 68 and beneath a pressure member 66 adjustable by means of the screw 48. From that point the tape passes between the roller dies 54 and 56 and thence through the shoe 14.

In a typical application, the tape may be made of galvanized steel, approximately 0.025" thick and up to ¾" wide. Of course, other metals of differing sizes and thicknesses may be accommodated and the contours applied to the tape may be varied by changing the contouring dies.

To begin operation with a fresh supply of tape in the magazine, a length may be drawn through the tool and temporarily anchored in the shoe 14. Pumping the handles together causes the frame 19 to move away from the shoe 14 and the roller dies 54 and 56 to contour the tape. The handle 41 causes the pinion 30 to rotate because of the engagement of the pinion 30 by the push rod 40. When the handle 41 is lifted, however, the pinion is released as the dog 46 travels over the top of the extension of the middle plate 26. When the handle 41 encounters the ratchet extension 65, the whole frame 19 is made free to slide along the rack 16. The temporary anchoring of the tape in the shoe 14 is discontinued and normal operation of the tool may begin after the unformed tape end is cut off.

Normal operation is preferably commenced by soldering the formed end of the tape to the end of undamaged armor remaining on the cable. Then, the handles are pumped together to contour a short length of tape which may be pulled through the shoe as the handles are released and the frame moves forward. No additional tape is fed from the magazine at this time because of the pressure exerted upon it by the insert 66. The entire tool is then swung about the cable, the shoe 14 being levered against the cable to assure tight seating of the armor on the cable. In some instances, the handles may be pumped and released several times to provide an adequate length of contoured tape for each wrapping motion.

The invention is not limited to the details of the foregoing preferred embodiment but should be measured by the appended claims.

I claim:

1. A portable manually operated tool for contouring metallic tape and wrapping it as armor upon a cable comprising a toothed rack, a cable-engaging shoe detachably secured to one end of said rack, a first handle disposed at the other end of said rack, a frame composed of a plurality of structural members detachably secured together and mounted on said rack, a magazine for holding a supply of metallic tape depending from said frame, an adjustable pressure member on said frame adjacent said magazine, said tape being threaded through said pressure member, a pair of removable contouring roller dies disposed for rotation and radial movement relative to one another in said frame, said tape being further threaded between said roller dies, adjusting screws threaded into said frame and operative to move one of said dies relative to the other whereby pressure on said tape by said dies is adjusted, a pinion having teeth meshing with those of said rack disposed for rotation in said rack, a second handle for rotating said pinion on said rack for limited distances to run said contouring dies over limited lengths of said tape, and means for disconnecting said second handle from said pinion and permitting said contoured tape to pass through said shoe, rotation of said tool about said cable permitting wrapping of said contoured tape thereon as armor therefor.

2. A portable, manually operated tool for contouring metallic tape and wrapping it as armor upon a cable comprising a toothed rack, a shoe at one end of said rack for engaging said cable, a frame mounted upon said rack, a pair of roller dies disposed for rotation in said frame, said tape being threaded from a source through said roller dies and said shoe, a pinion having teeth meshing with those of said rack, also disposed for rotation in said frame, means for moving said pinion on said rack to cause said roller dies to contour said tape and means for rotating said tool about said cable to wrap said contoured tape thereon.

3. A tool as defined in claim 2 wherein said means for moving said pinion on said rack comprises a handle, a push rod disposed in said handle and normally urged into contact with said pinion upon movement of said handle in a first direction, and means for disengaging said push rod from said pinion in response to movement of said handle in a direction opposite said first direction.

4. A tool as defined in claim 1 wherein said source of tape comprises a magazine attached to said frame for holding a quantity of said tape, and means disposed adjacent said magazine for holding said tape under continuous pressure as it emerges from said magazine to be threaded through said roller dies and said shoe.

5. A tool as defined in claim 1 and further including means disposed in said frame for adjusting the position of one of said roller dies relative to the other whereby the pressure on said tape threaded between said roller dies may be adjusted.

6. A tool as defined in claim 1 wherein said frame comprises a plurality of structural members detachably secured together whereby said pair of roller dies may be removed and replaced.

7. A tool as defined in claim 3 and further including a ratchet normally engaging said pinion to limit rotation thereof, an extension being formed upon said ratchet, contact of said handle with said extension causing disengagement of said ratchet from said pinion.

8. A tool as defined in claim 4 and further including adjustable means disposed in said frame and bearing upon said means for holding said tape under continuous pressure, movement of said adjustable means causing changes in said pressure on said tape.

9. A tool as defined in claim 1 and further including means detachably securing said shoe to said rack whereby said shoe may be removed and replaced.

* * * * *

UNITED STATES PATENT AND TRADEMARK OFFICE
CERTIFICATE OF CORRECTION

PATENT NO. : 4,157,614
DATED : June 12, 1979
INVENTOR(S) : Teofilo Pring

It is certified that error appears in the above-identified patent and that said Letters Patent are hereby corrected as shown below:

Claim 4, line 1, change "claim 1" to --claim 2--.

Claim 5, line 1, change "claim 1" to --claim 2--.

Claim 6, line 1, change "claim 1" to --claim 2--.

Claim 9, line 1, change "claim 1" to --claim 2--.

Signed and Sealed this

Second Day of October 1979

[SEAL]

Attest:

RUTH C. MASON
Attesting Officer

LUTRELLE F. PARKER
Acting Commissioner of Patents and Trademarks